(12) United States Patent
Matsunaga et al.

(10) Patent No.: US 8,098,036 B2
(45) Date of Patent: Jan. 17, 2012

(54) ELECTRIC POWER TOOL

(75) Inventors: Yutaka Matsunaga, Anjo (JP); Hidekazu Suda, Anjo (JP); Takeshi Nishimiya, Anjo (JP)

(73) Assignee: Makita Corporation, Anjo-shi (JP)

( * ) Notice: Subject to any disclaimer, the term of this patent is extended or adjusted under 35 U.S.C. 154(b) by 383 days.

(21) Appl. No.: 12/457,965

(22) Filed: Jun. 26, 2009

(65) Prior Publication Data

US 2010/0001675 A1   Jan. 7, 2010

(30) Foreign Application Priority Data

Jul. 4, 2008   (JP) ................................ 2008-176016

(51) Int. Cl.
  *H02P 7/06* (2006.01)
  *H02K 11/00* (2006.01)
  *G05B 9/00* (2006.01)

(52) U.S. Cl. ........ 318/446; 318/246; 318/268; 318/490; 388/811; 30/276

(58) Field of Classification Search .................. 318/139, 318/236, 268, 446, 434, 490; 388/811; 30/276
See application file for complete search history.

(56) References Cited

U.S. PATENT DOCUMENTS

| | | | |
|---|---|---|---|
| 4,493,377 A | | 1/1985 | Gunther et al. |
| 4,860,451 A | * | 8/1989 | Pilatowicz et al. ............. 30/276 |
| 5,449,992 A | * | 9/1995 | Geiger et al. ................. 318/362 |
| 5,644,112 A | * | 7/1997 | Geiger et al. ................. 200/1 R |
| 5,708,333 A | * | 1/1998 | Kirn ............................. 318/246 |
| 6,014,812 A | * | 1/2000 | Webster ......................... 30/276 |
| 6,301,788 B1 | * | 10/2001 | Webster ......................... 30/276 |
| 6,439,088 B1 | * | 8/2002 | Eytchison et al. ................ 83/13 |
| 6,484,484 B1 | * | 11/2002 | Thomas ......................... 56/13.7 |
| 7,538,503 B2 | * | 5/2009 | Machens et al. ............... 318/268 |
| 2004/0075408 A1 | * | 4/2004 | Gorti et al. .................... 318/381 |
| 2004/0207351 A1 | * | 10/2004 | Hahn et al. .................... 318/379 |
| 2006/0005673 A1 | * | 1/2006 | Long et al. ........................ 83/13 |
| 2007/0145925 A1 | * | 6/2007 | DeCicco et al. .............. 318/432 |
| 2007/0160353 A1 | * | 7/2007 | DeCicco et al. .............. 388/811 |
| 2008/0042607 A1 | * | 2/2008 | Miyazaki et al. .............. 318/504 |
| 2008/0106225 A1 | * | 5/2008 | Mueller et al. ................ 318/139 |
| 2009/0051306 A1 | * | 2/2009 | Matsunaga et al. ........... 318/434 |
| 2009/0295313 A1 | * | 12/2009 | Suzuki et al. ................. 318/139 |

FOREIGN PATENT DOCUMENTS

DE   102004018966 A1   12/2005
JP   A-57-109230   7/1982

OTHER PUBLICATIONS

European Search Report in related Application No. 09008780.0, mailed Aug. 3, 2011.

* cited by examiner

*Primary Examiner* — Paul Ip
(74) *Attorney, Agent, or Firm* — Oliff & Berridge, PLC

(57) ABSTRACT

An electric power tool is provided that includes a motor as a driving source, a first operation switch, a first semiconductor switch, and a second semiconductor switch. The first operation switch is operated by a user to be turned ON/OFF. The first semiconductor switch, provided on a current path from the power source to the motor, includes at least one semiconductor switching device. When the first operation switch is OFF, the first semiconductor switch is turned OFF to interrupt the current path. When the first operation switch is ON, the first semiconductor switch is turned ON to close the current path. The second semiconductor switch is provided on the current path in series with the first semiconductor switch and includes at least one semiconductor switching device. The second semiconductor switch closes/interrupts the current path by being turned ON/OFF in accordance with an input control signal.

13 Claims, 9 Drawing Sheets

ELECTRIC POWER TOOL

BACKGROUND

The present invention relates to an electric power tool operated by a motor.

A conventional motor-operated electric power tool uses a semiconductor switch for closing/interrupting a current path from a power source to a motor. In the electric power tool constituted as such, the semiconductor switch, provided on the current path from the power source to the motor, is controlled to be turned ON/OFF in accordance with a state of a contact switch operated by a user of the tool. Thus, a driving current (high current) for driving the motor does not directly flow to the contact switch. The contact switch to be used can be the one that has small contact capacity.

In a constitution such that the current path from the power source to the motor is closed/interrupted by the semiconductor switch, however, the motor continuously operates when short-circuit fault (which keeps the semiconductor switch normally-ON) occurs to the semiconductor switch. Therefore, application of a semiconductor switch to an electric power tool is restricted to a very limited use in practice, on the assumption that short-circuit fault may occur to the semiconductor switch.

A method to deal with such fault of a semiconductor switch is disclosed in Unexamined Patent Publication No. 57-109230 as an example. In this method, parallel use of a semiconductor switch and a contact switch is proposed. Specifically, on the current path from the power source to the motor, not only a triac as a semiconductor switch but also a contact power switch is provided which is turned ON (becomes conductive)/OFF (becomes nonconductive) directly by user operation.

SUMMARY

According to the method described above, even if short-circuit fault occurs to the semiconductor switch, the contact switch can be turned OFF to directly interrupt the current path to the motor. A situation can be avoided in which current continues to flow to the motor even if short-circuit fault occurs to the motor. Reliability of the tool is improved.

Of course, however, a large current for driving the motor may directly flow through the contact switch which closes/interrupts the current path to the motor. Thus, it is necessary for the contact switch to have large contact capacity. Increase is incurred in size and cost of the tool.

Moreover, depending on a region in the tool where the contact switch is disposed, a thick wiring line through which a large current flows may have to be installed over a long distance. In that case, increase in size and cost of the tool is further promoted.

In one aspect of the present invention, it is desirable, in an electric power tool configured to close/interrupt a current path to a motor by a semiconductor switch, that reliability of the tool can be improved without providing a contact switch having large contact capacity.

An electric power tool in a first aspect of the present invention includes a motor as a driving source, a first operation switch, a first semiconductor switch, and a second semiconductor switch. The first operation switch is operated by a user to be turned ON/OFF. The first semiconductor switch, provided on a current path from the power source to the motor, includes at least one semiconductor switching device. When the first operation switch is OFF, the first semiconductor switch is turned OFF to interrupt the current path. When the first operation switch is ON, the first semiconductor switch is turned ON to close the current path. The second semiconductor switch is provided separately from the first semiconductor switch. Particularly, the second semiconductor switch is provided on the current path in series with the first semiconductor switch and includes at least one semiconductor switching device. The second semiconductor switch closes/interrupts the current path by being turned ON/OFF in accordance with an input control signal.

In the electric power tool configured as above, the first semiconductor switch and the second semiconductor switch are provided on the current path from the power source to the motor. Thus, when both the semiconductor switches are turned ON, current flows so that the motor is rotationally driven. If either of the semiconductor switches is OFF, current does not flow and the motor does not rotate. According to the electric power tool, even if short-circuit failure occurs to either one of the first and the second semiconductor switches, application of current to the motor can be stopped by turning OFF the other which operates normally. It is possible to inhibit the motor from continuing to operate despite the user's intent. Without providing a contact switch having large contact capacity on the current path from the power source to the motor, reliability of the electric power tool can be improved against failure of a semiconductor switch.

The electric power tool of the present invention may include a control unit that outputs a control signal to the second semiconductor switch for controlling the second semiconductor switch. In this case, a state of the second conductor switch is controlled in accordance with the control signal from the control unit. The first semiconductor switch directly reflects a state (ON or OFF) of the first operation switch operated by the user. In other words, when the first operation switch is turned ON, the first semiconductor switch is also turned ON. When the first operation switch is turned OFF, the first semiconductor switch is also turned OFF.

Accordingly, even if the second semiconductor switch fails and continues to be ON (short-circuit failure), or the control unit malfunctions although the second semiconductor switch operates normally, so that the control signal to turn ON the second semiconductor switch is continued to be outputted due to some cause, application of current to the motor can be stopped because the first semiconductor switch is turned OFF when the user turns OFF the first operation switch. Even if short-circuit failure occurs to the first semiconductor switch, application of current to the motor can be stopped when the control unit turns OFF the second semiconductor switch.

According to the electric power tool as constituted above, even if short-circuit failure occurs to either one of the first and the second semiconductor switches, application of current to the motor can be stopped by turning OFF the other which operates normally. It is possible to inhibit the motor from continuing to operate despite the user's intent. Without providing a contact switch having large contact capacity on the current path from the power source to the motor, reliability of the electric power tool can be improved against failure of a semiconductor switch.

When current is applied to the motor, the second semiconductor switch may be controlled by the control unit, for example, to be normally-ON (conductive) to operate the motor while current flows. Or, for example, application of current to the motor (and a number of rotation/torque of the motor) may be arbitrarily controlled by PWM (Pulse Wide Modulation) control at a specified duty ratio. There is no specific limitation in method for particular current control by the second semiconductor switch.

The electric power tool of the present invention may include a conductive state detection unit that detects a conductive state of the first semiconductor switch when the first operation switch is OFF. If it is detected by the conductive state detection unit that the first semiconductor switch is ON (conductive) although the first operation switch is OFF, it can be determined that short-circuit failure has occurred to the first semiconductor switch.

The above constituted electric power tool is effective since short-circuit failure can be detected if such failure occurs to the first semiconductor switch.

In the case that the conductive state detection unit as above is provided, the electric power tool may further include a notification unit that notifies the user of the failure of the first semiconductor switch, if it is detected by the conductive state detection unit that the first semiconductor switch is conductive when the first operation switch is OFF.

According to the above constituted electric power tool, the user can recognize short-circuit failure if such failure occurs to the first semiconductor switch. The user can promptly take appropriate measures against the failure.

In the case that the electric power tool includes the conductive state detection unit, the electric power tool may further includes a compulsory off unit, instead of the notification unit (or in addition to the notification unit), that forcibly turns OFF the second semiconductor switch if it is detected by the conductive state detection unit that the first semiconductor switch is conductive when the first operation switch is OFF.

According to the above constituted electric power tool, the second semiconductor switch is forcibly turned OFF. Thereby, application of current to the motor is forcibly stopped. It is possible to inhibit the motor from continuing to operate despite the user's intent.

The compulsory off unit may be configured, separately from the control unit, for example, to forcibly turn OFF the second semiconductor switch regardless of the control signal from the control unit. Alternatively, for example, the control unit may also function as the compulsory off unit, that is, the control unit itself may be configured to forcibly output the control signal to turn OFF the second semiconductor switch.

Here, based on what the control unit turns ON/OFF the second semiconductor switch can be arbitrarily determined. For example, the control unit may be configured to operate in accordance with the state of the first operation switch. Also, for example, a second operation switch which can be operated by the user to be turned ON/OFF may be provided separately from the first operation switch. The control unit may be then configured to operate in accordance with a state of the second operation switch.

Specifically, in the former configuration (i.e., the control unit operates in accordance with the state of the first operation switch), the control unit may be configured to interrupt the current path by outputting the control signal to turn OFF the second semiconductor switch when the first operation switch is OFF, while outputting the control signal to apply current to the motor when the first operation switch is ON.

According to the above constituted electric power tool, the user can only operate the first operation switch to activate or stop the motor. Thus, without increasing a number of parts as well as with maintenance of convenience in operability of only operating one operation switch, reliability of the tool can be improved against failure of a semiconductor switch.

In the latter configuration (i.e., the control unit operates in accordance with the state of the second operation switch), the control unit may be configured to interrupt the current path by outputting the control signal to turn OFF the second semiconductor switch when the second operation switch is OFF, while outputting the control signal to apply current to the motor when the second operation switch is ON.

According to the above constituted electric power tool, current is applied to the motor when the user turns ON both the first operation switch and the second operation switch. Application of current to the motor is interrupted to stop the motor if either one of the switches is turned OFF. An electric power tool can be provided with high reliability.

Moreover, the electric power tool may be configured as follows in the case that the two switches, that is, the first operation switch and the second operation switch, are provided to be operated by the user. Specifically, the first semiconductor switch may be configured to be turned OFF when either one of the first operation switch and the second operation switch is OFF, and turned ON when both the operation switches are ON. The control unit may be configured to output the control signal for turning OFF the second semiconductor switch to interrupt the current path when either one of the first operation switch and the second operation switch is OFF, and output the control signal to apply current to the motor when both the operation switches are ON.

According to the above constituted electric power tool, the first semiconductor switch is not turned ON by only turning ON the first operation switch. Also, the second semiconductor switch is not turned ON by only turning ON the second operation switch. In order to turn ON the first semiconductor switch, it is necessary to turn ON both the two operation switches. Current control by the second semiconductor switch is also performed when both the two operation switches are ON. Reliability of the electric power tool can be further enhanced.

The electric power tool including the first operation switch and the second operation switch may be particularly configured as follows, for example. The electric power tool may include a first grip member to be held with one hand of the user and a second grip member to be held with the other hand when the user uses the electric power tool. Each of the first operation switch and the second operation switch may be provided on either of the first gripping member or the second gripping member.

According to the above constituted electric power tool, the user can operate the first operation switch and the second operation switch while holding the first gripping member and the second gripping member with both hands during use of the electric power tool. Usability is improved. Moreover, if each of the operation switches is configured, for example, to be turned ON while the user touches the switch and turned OFF when the user releases the switch, the motor stops when the gripping member provided with the operation switch is off the hand of the user during use of the tool. It is thus possible to inhibit the tool from continuing to be operated even if the tool is off the hand of the user.

The electric power tool, provided with each of the operation switches on either of the gripping members as above, may be particularly embodied as a grass mower, for example. Specifically, the grass mower includes a motor housing, a power supplier, a mowing blade, and a main support member. The motor housing houses a motor. The power supplier supplies power to the motor. The mowing blade for mowing grass is rotated by a driving force of the motor. The main support member is a bar-like member having a specified length. The motor housing and the power supplier are provided on one end side of the main support member. The mowing blade is rotatably provided on the other end side of the main support member. Both the first gripping member and the second gripping member are provided on the main support member. Each of the first operation switch and the second operation switch may be provided on either of the first gripping member or the second gripping member so as to be operable by the user holding the gripping member.

In the grass mower constituted as above, there is a physically large distance from the operation switches operated by the user to the motor and the power supplier due to its design. Thus, wiring lines from the respective switches to the motor and the power supplier become long. The respective operation switches can be configured so that current (large current) that flows to the motor does not directly flow therethrough. In that case, contact switches having small contact capacity can be adopted as the operation switches. The wiring lines from the respective switches to the motor and the power supplier can have a small allowable current value (can be thin and light).

Accordingly, there is no need to install thick wiring lines through which a large current flows over a wide area inside the grass mower. Weight trimming and downsizing of the grass mower can be achieved. Freedom of assembling and designing the rechargeable grass mower is improved.

The power tool provided with each of the operation switches on either of the gripping members may be configured as follows, for example. The first operation switch may be provided on one of the first gripping member and the second gripping member in such a manner as to be operated by the user holding the gripping member and turned OFF when the first operation switch is off the hand of the user. The second operation switch may be provided on the other of the first gripping member and the second gripping member where the first operation switch is not provided in such a manner as to be operated by the user holding the gripping member and turned OFF when the second operation switch is off the hand of the user.

In other words, either of the operation switches may be provided on each of the first gripping member and the second gripping member. In this case, in order to activate the motor to use the tool, the user has to hold the respective gripping members with both hands and turn ON the respective switches with both hands. When either hand of the user is off the gripping member and the operation switch provided on the gripping member, the operation switch is turned OFF and either of the semiconductor switches associated with the operation switch is turned OFF.

According to the above constituted electric power tool, the motor is activated only when the user holds the respective gripping members with both hands and turns ON the respective switches. If either hand of the user is off the gripping member and either of the operation switches provided on the gripping member is turned OFF, the motor is stopped. Safety can be enhanced when the user uses the tool.

The motor and the second semiconductor switch constituting the electric power tool of the present invention may be configured as follows. For example, if the motor is a brush direct current motor activated by direct current, the second semiconductor switch may be configured as an H-bridge circuit including a plurality of semiconductor switching devices.

Also, for example, if the motor is a brush direct current motor activated by direct current, the second semiconductor switch may be configured as a three-phase bridge circuit including a plurality of semiconductor switching devices.

In either case, in order to apply current to the motor, the first semiconductor switch has to be first turned ON. Then, the control unit controls the second semiconductor switch (the H-bridge circuit or the three-phase bridge circuit; particularly, controls ON/OFF of the plurality of semiconductor switching devices constituting the second semiconductor switch) to apply current to the motor.

BRIEF DESCRIPTION OF THE DRAWINGS

The present invention will now be described by way of example with reference to the accompanying drawings, in which.

DETAILED DESCRIPTION OF THE PREFERRED EMBODIMENTS

First Embodiment

Figure 1:
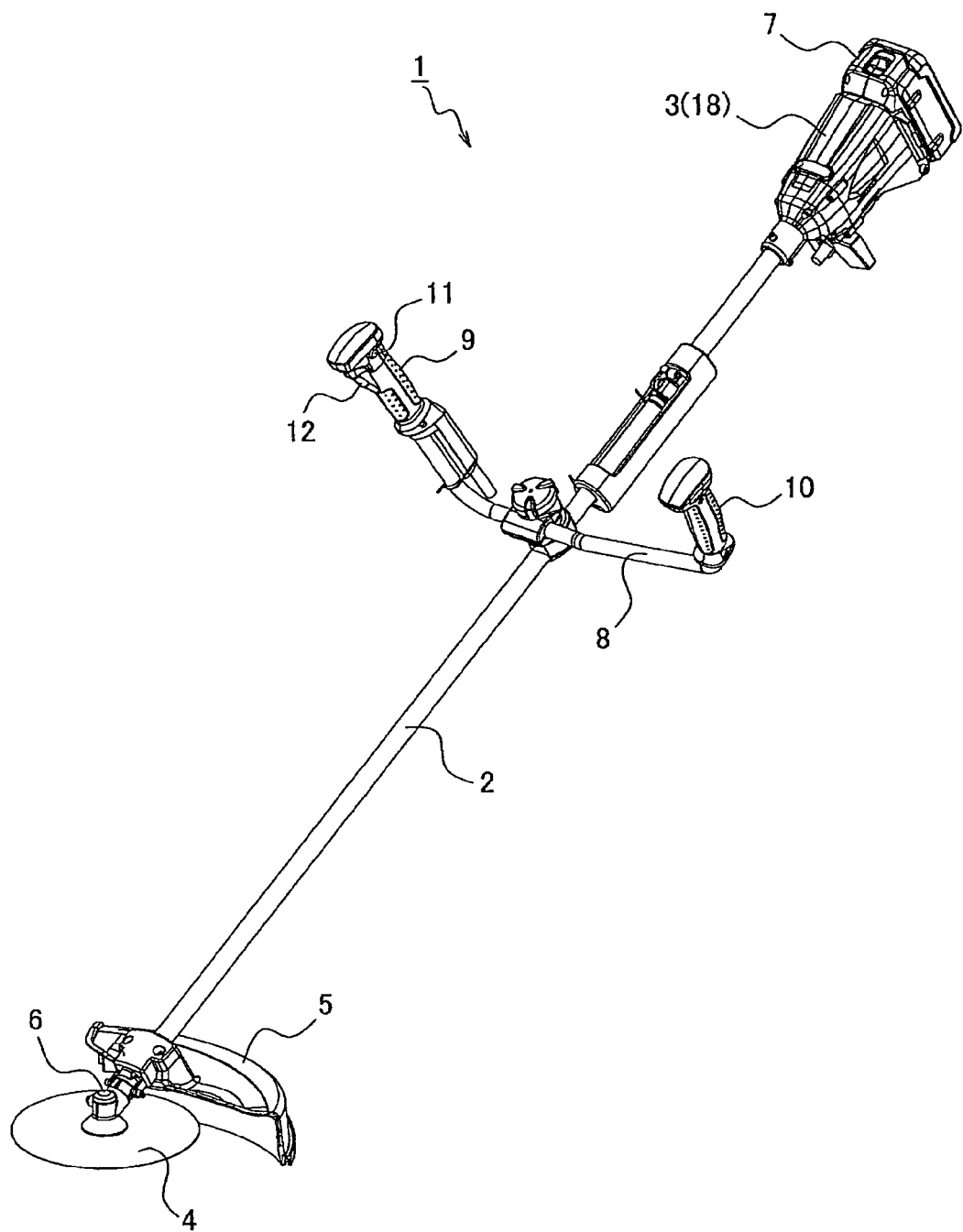
FIG. 1 is a perspective view showing an overall appearance of a rechargeable grass mower in a first embodiment.

As shown in FIG. 1, a rechargeable grass mower 1 of the present embodiment includes a bar-like main pipe 2 having a specified length, a motor unit 3 and a battery 7 provided on an upper end side of the main pipe 2, and a rotatable mowing blade 4 for mowing grass provided on a lower side of the main pipe 2.

The motor unit 3 houses a motor 18 as a driving source for rotationally driving the mowing blade 4, and a various electronic circuits, devices, wiring lines and so on, such as a control circuit 13 (see FIG. 2) that controls application of current to the motor 18. The motor 18 of the present embodiment is a brush direct current (DC) motor.

The main pipe 2 is formed into a hollowed cylinder as a whole. Inside the main pipe 2, a driving force transmitting shaft (not shown) is housed which transmits a rotational driving force of the motor 18 to the mowing blade 4. The mowing blade 4 is coupled with the driving force transmitting shaft through a gear case 6 on the lower side of the main pipe 2. Accordingly, the rotational driving force of the motor 18 is transmitted to the mowing blade 4 via the driving force transmitting shaft and various gears inside the gear case 6. The mowing blade 4 is rotated by the transmitted rotational driving force. An antiscattering cover 5 is attached to the lower end side of the main pipe 2.

A substantially U-shaped handle 8 is fixed in a vicinity of an intermediate position in a length direction of the main pipe 2. On one end side of the handle 8 is provided with a right hand grip 9 held by a user with the right hand. On the other end side of the handle 8 is provided with a left hand grip 10 held by a user with the left hand.

A contact lock-off switch 11 and a trigger switch 12 operated to be turned ON/OFF by a user are provided on a front end side of the right hand grip 9. The user can turn ON the respective switches 11, 12, for example, by depressing the lock-off switch 11 with a thumb and drawing the trigger switch 12 with an index finger, in a state that the left hand grip 9 is held with the left hand.

Inside the handle 8 and the main pipe 2, wiring lines (not shown) are installed for electrically connecting the respective switches 11, 12 to the control circuit 13 inside the motor unit 3. Therefore, operation states (ON/OFF state) of these switches 11, 12 are transmitted to the control circuit 13 through the wiring lines.

Both the lock-off switch 11 and the trigger switch 12 are normally-OFF while the hands of the user are off the lock-off switch 11 and the trigger switch 12, and are ON while the user touches the lock-off switch 11 and the trigger switch 12 and performs predetermined ON-operation. In the rechargeable grass mower 1 of the present embodiment, because of a not shown interlock mechanism, the trigger switch 12 is unable to be drawn while the lock-off switch 11 is not depressed. To draw and turn ON the trigger switch 12, it is necessary that the lock-off switch 11 is depressed. Also, when only the lock-off switch 11 is released while the both switches 11, 12 are ON, the lock-off switch 11 does not return to its original position unless the trigger switch 12 is returned as well.

A high current such as that flows to the motor 18 does not flow into the wiring lines connecting the lock-off switch 11 and the trigger switch 12 to the control circuit 13. Only a small current flows for transmitting the ON/OFF state of the respective switches 11, 12. Accordingly, a thick wiring line for flowing current to the motor 18 from the battery 7 is not necessary for these wiring lines. Thin wiring lines are sufficient.

The battery 7 includes therein a rechargeable battery (a lithium ion rechargeable battery, for example). The battery 7 can be attached to or detached from the motor unit 3. When charging the battery 7 (i.e., rechargeable battery), the battery 7 is detached from the motor unit 3 and connected to a charger (not shown). Then, charging becomes available.

Figure 2:
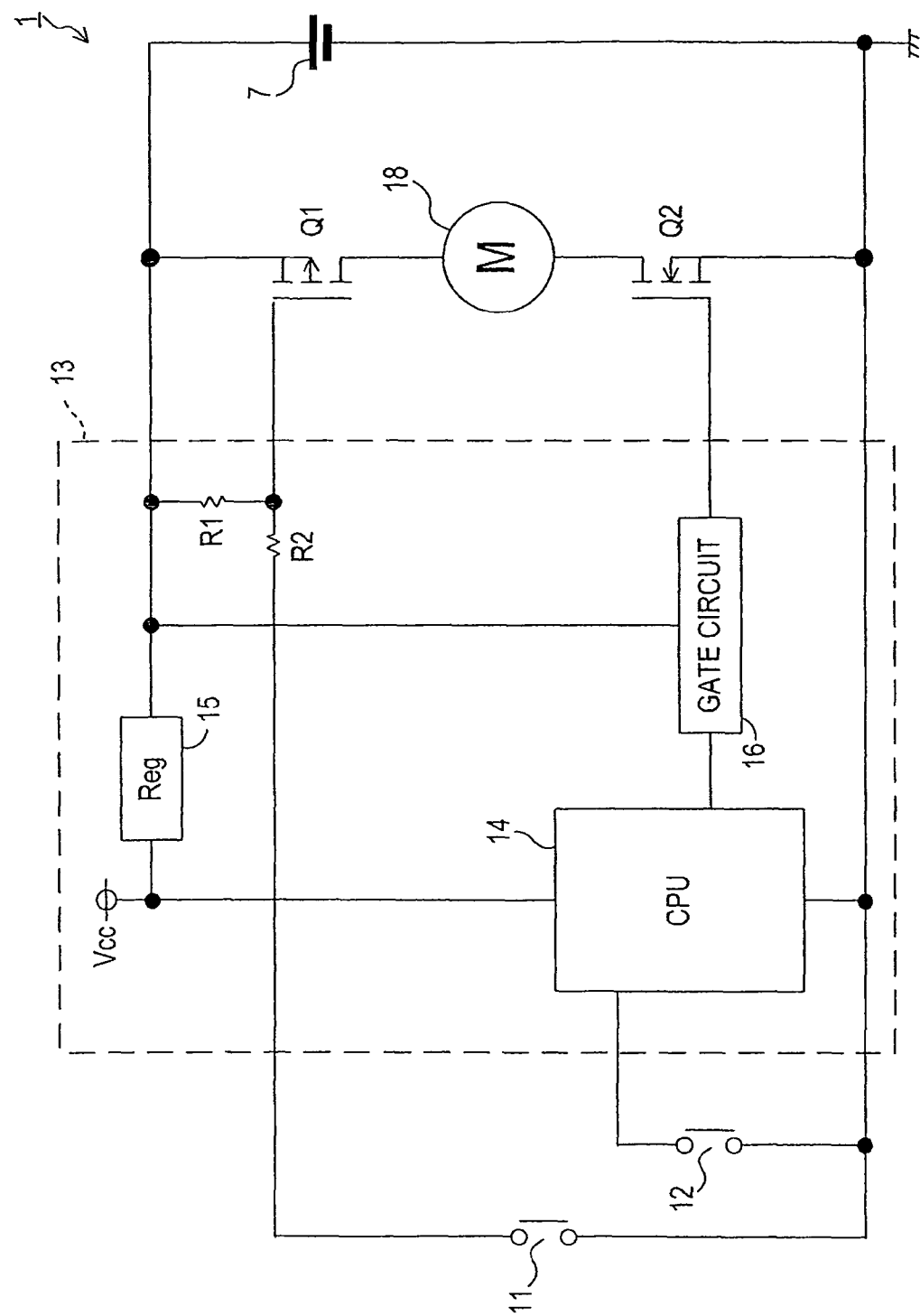
FIG. 2 is an electrical circuit diagram showing a configuration of the rechargeable grass mower in the first embodiment.

Now, detailed description on operation of the rechargeable grass mower 1 of the present embodiment is given referring to an electric circuit diagram in FIG. 2. As shown in FIG. 2, in the grass mower of the present embodiment, a first semiconductor switch Q1 and a second semiconductor switch Q2 are connected in series on a current path from the battery 7 to the motor 18. The control circuit 13 for turning ON/OFF the respective semiconductor switches Q1, Q2 is also provided. It is to be noted that a simple expression "current path" in the following description indicates the current path from a power source (battery 7 in the present embodiment) to a motor.

The first semiconductor switch Q1 is configured as a P-channel MOSFET, provided on an upstream side of the motor (positive terminal side of the battery 7) on the current path. An OFF state of the first semiconductor switch Q1 interrupts the current path thereby to stop applying current to the motor 18. An ON state of the first semiconductor switch Q1 closes the current path.

Specifically, a gate of the first semiconductor switch Q1 is connected to an end of the lock-off switch 11 via a resistor R2 inside the control circuit 13. A source of the first semiconductor switch Q1 is connected to the positive terminal of the battery 7. A drain of the first semiconductor switch Q1 is connected to the motor 18. A resistor R1 for bias generation is connected between the gate and the source. The other end of the lock-off switch 11 is grounded.

The first semiconductor switch Q1 is turned ON/OFF in accordance with an operation state of the lock-off switch 11, in the above described configuration. In other words, when the lock-off switch 11 is turned OFF, the first semiconductor switch Q1 is also turned OFF. The current path is interrupted by at least the first semiconductor switch Q1. When the lock-off switch 11 is turned ON, the first semiconductor switch Q1 is also turned ON. The current path is close at least at a connection portion of the first semiconductor switch Q1.

The second semiconductor switch Q2 is configured as an N-channel MOSFET, provided on a downstream side of the motor (negative terminal side of the battery 7) on the current path. An OFF state of the second semiconductor switch Q2 interrupts the current path thereby to stop applying current to the motor 18. An ON state of the second semiconductor switch Q2 closes the current path. In the second semiconductor switch Q2, a gate is connected to a CPU 14 via a gate circuit 16 inside the control circuit 13, a source is connected to a negative terminal of the battery 7, and a drain is connected to the motor 18.

The control circuit 13 includes, other than the resistors R1, R2 described above, the CPU 14 which generates and outputs a control signal for controlling the second semiconductor switch Q2, and the gate circuit 16 that turns ON/OFF the second semiconductor switch Q2 in accordance with the control signal from the CPU 14.

The CPU 14 is specifically configured as a microcomputer including a memory, an input/output (I/O) interface, and others. The CPU 14 turns ON/OFF the second semiconductor switch Q2 in accordance with an operation state of the trigger switch 12. In other words, when the trigger switch 12 is turned OFF, the CPU 14 outputs the control signal for turning OFF the second semiconductor switch Q2 to the gate circuit 16 thereby to turn OFF the second semiconductor switch Q2. The current path is interrupted by at least the second semiconductor switch Q2.

When the trigger switch 12 is turned ON, the CPU 14 outputs to the gate circuit 16 the control signal for controlling the second semiconductor switch Q2, so that a desired current flows to the motor 18. Particularly how to control the second semiconductor switch Q2 by the control signal can be arbitrarily determined depending on a current value to be applied to the motor 18, etc. For example, the second semiconductor switch Q2 may be kept ON. Or, the second semiconductor switch Q2 may be ON/OFF controlled (PWM controlled) at a specified duty ratio, for example.

The gate circuit 16 receives power from the battery 7. The gate circuit 16 turns ON or OFF the second semiconductor switch Q2 in accordance with the control signal from the CPU 14. Various types of the gate circuit 16 for driving (i.e., turning ON/OFF) the gate of the MOSFET in accordance with the control signal are already known. Thus, detailed description thereof is omitted here.

The control circuit 13 includes a constant voltage power source circuit (Reg) 15 that sets down the power of the battery 7 to a predetermined voltage (e.g., 5 V) of a control power source Vcc. The CPU 14 receives the voltage of the control power source Vcc from the constant voltage power source circuit 15 to operate.

The trigger switch 12 of the present embodiment is constituted only from a contact switch that is simply turned ON/OFF. In addition to the contact switch, a unit that can output to the CPU 14 a signal corresponding to an operation amount (drawing amount) of a user (a variable resistor that changes resistance depending on the operation amount, for example) may be provided, so that a current value applied to the motor 18 (and a number of rotation of the motor 18) can be changed in accordance with the operation amount of the trigger switch 12. The same applies to trigger switches in other embodiments later described.

When utilizing the rechargeable grass mower 1 of the present embodiment constituted as above, the user first holds the right hand grip 9 and the left hand grip 10 with the right and left hands, thereby to support the whole rechargeable grass mower 1. When the user turns ON the lock-off switch 11 provided on the right side grip 9, the first semiconductor switch Q1 is turned ON. When the user further turns ON the trigger switch 12 provided on the right hand grip 9, the CPU 14 outputs the control signal for flowing a desired current to the motor 18 thereby to control the second semiconductor switch Q2. As a result, the motor 18 is rotated and the mowing edge 4 is rotated so that grass mowing operation is enabled.

When the trigger switch 12 is turned OFF during rotation of the motor 18, that is, while both the lock-off switch 11 and the trigger switch 12 are ON, the second semiconductor switch Q2 is turned OFF and application of current to the motor 18 is stopped. When the trigger switch 12 is turned OFF and the lock-off switch 11 is also turned OFF, the first semiconductor switch Q1 is also turned OFF.

In the rechargeable grass mower 1 of the present embodiment, since the two semiconductor switches Q1, Q2 are provided in series on the current path to the motor 18, due consideration is given to reliability and safety against short-circuit failure of the semiconductor switches Q1, Q2.

Specifically, in case that a semiconductor switch constituted from a semiconductor switching device like a MOSFET and the like is failed, the failure is mostly caused by short-circuit failure. In the present embodiment, the two semiconductor switches Q1, Q2 are connected in series on the current path. Even if short-circuit failure occurs to one of the semiconductor switches Q1, Q2, current does not continue to flow to the motor 18 as long as the other of the semiconductor switches Q1, Q2 operates normally.

According to the grass mower 1 of the present embodiment, even if short-circuit failure occurs to either one of the first and the second semiconductor switches Q1, Q2, application of current to the motor 18 can be stopped by turning OFF the other which operates normally. It is possible to inhibit the motor 18 from continuing to operate despite the user's intent. Without providing a contact switch having large contact capacity on the current path from the battery 7 to the motor 18, reliability can be improved against failure of the semiconductor switches Q1, Q2 which closes/interrupts the current path.

In the rechargeable grass mower 1 of the present embodiment, there is a large distance from the lock-off switch 11 and the trigger switch 12 to the motor 18 due to its constitution. It is impossible to accommodate these switches 11 and 12 and the motor 18 in one housing. Thus, in case that, for example, the first semiconductor switch Q1 is disposed on the right hand grip 9 as a contact switch operated by the user (that is, to directly close/interrupt the current path with the lock-off switch 11), a thick wiring line through which a high current flows is installed over a long distance in a broad area including the left hand grip 9. Various problems occur such as increase in size, weight and costs of the device as a whole.

In the present embodiment, the two semiconductor switches Q1, Q2 are used as the switches that directly close/interrupt the current path to the motor 18, so that a high current does not flow into the lock-off switch 11 and the trigger switch 12 directly operated by the user. Accordingly, a contact switch having small contact capacity can be adopted as the lock-off switch 11 and the trigger switch 12. Moreover, wiring lines from these switches 11, 12 to the motor unit 3 can have a small allowable current value (can be thin and light).

There is no need of installing a thick wiring line through which a high current flows over a long distance. Weight trimming, downsizing, cost reduction and improvement in safety can be achieved. Moreover, flexibility is increased in assembling and designing the rechargeable grass mower 1.

Second Embodiment

Figure 3:
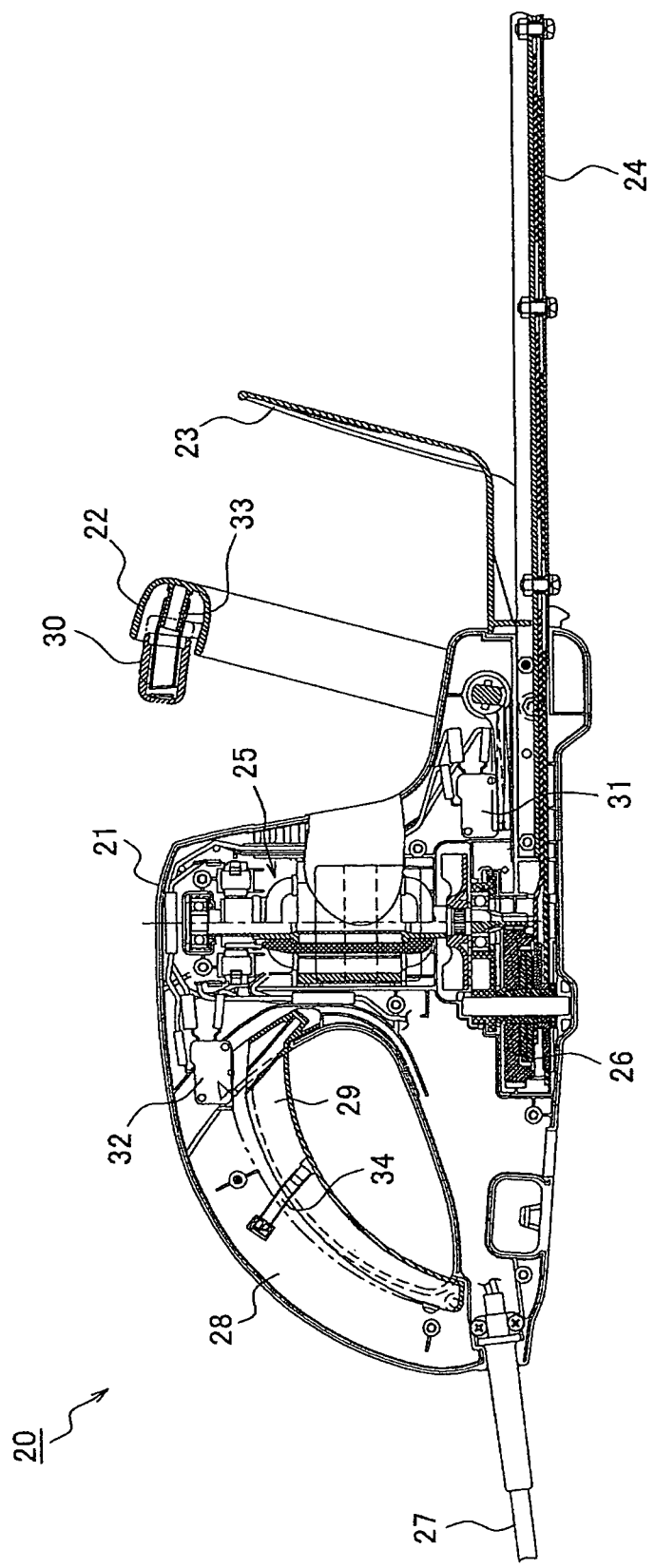
FIG. 3 is a sectional side view showing an overall appearance of an electric hedge trimmer in a second embodiment.

As shown in FIG. 3, an electric hedge trimmer 20 of the present embodiment is an electric power tool used for trimming a hedge and pruning a garden tree in gardening and others. In the electric hedge trimmer 20, alternate current power from an external alternate current power source 41 (see FIG. 4; single phase 100 V, for example) is taken into a housing 21 through a power source cord 27. A motor 25 inside the housing 21 is rotationally driven by the alternate current power thereby to operate a shear blade 24.

Specifically, the housing 21 houses various electronic circuits, devices and wirings, such as the motor 25 as a driving source that drives the shear blade 24, a gear assembly 26 that transmits a rotational driving force of the motor 25 to the shear blade 24, a control circuit 43 (not shown in FIG. 3; see FIG. 4) that controls application of current to the motor 25, and so on.

The shear blade 24 is attached to the front side of the housing 21. On the front side of the housing 21, a protector 23 is provided to cover the top of the shear blade 24.

A grip portion 28 that a user can hold with either of the hands is formed on the back side of the housing 21. A trigger 29 is provided on the grip portion 28 and can be operated while the user holds the grip portion 28. An operation state of the trigger 29 is reflected on a contact trigger switch 32 provided inside the housing 21. The trigger switch 32 is OFF in an initial state where the trigger 29 is off the hand of the user and not operated (the state shown in FIG. 3). The trigger switch 32 is turned ON when the trigger 29 is drawn upward by the user against a biasing force of a spring 34.

On the front side of the housing 21, a substantially U-shaped grip 22 is provided to be held with the other hand of the user, opposite to the hand holding the grip portion 28. A switch lever 30 is provided on the grip 22 and can be operated while the user holds the grip 22. An operation state of the switch lever 30 is reflected on a contact grip switch 31 provided inside the housing 21. The grip switch 31 is OFF in an initial state where the grip 22 is off the hand of the user and not operated (the state shown in FIG. 3). The grip switch 31 is turned ON when the grip 22 is pressed forward by the user against a biasing force of a spring 33.

Since the power taken in from outside is alternate current power, the electric hedge trimmer 20 of the present embodiment includes a converter 42 (see FIG. 4) that converts alternate current to direct current inside the housing 21. Therefore, the motor 25 is driven by direct current after conversion by the converter 42. The motor 25 of the present embodiment is also a brush direct current motor.

Figure 4:
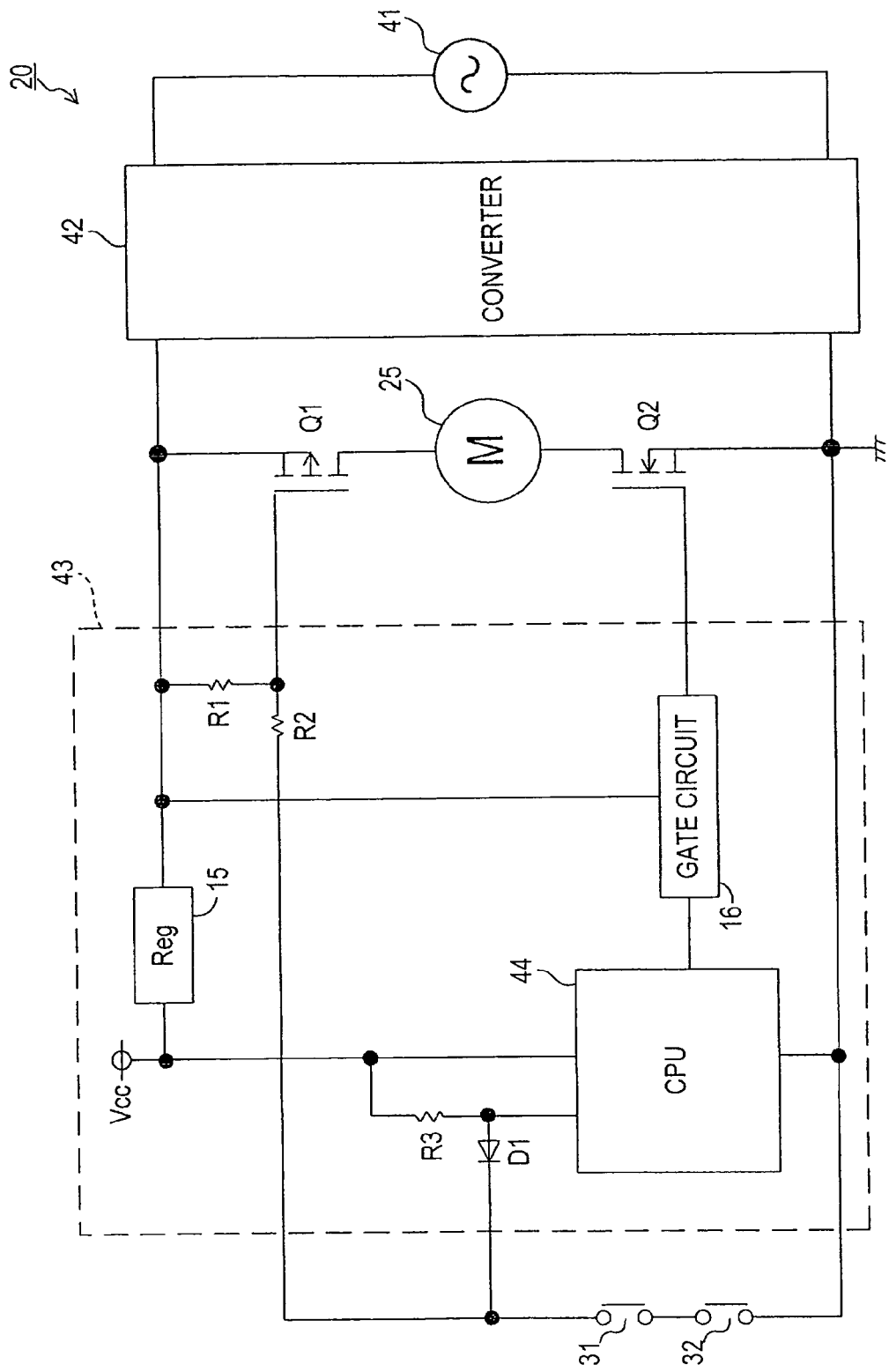
FIG. 4 is an electrical circuit diagram showing a configuration of the electric hedge trimmer in the second embodiment.

Operation of the electric hedge trimmer 20 of the present embodiment will be now described in detail referring to an electrical circuit diagram shown in FIG. 4. As shown in FIG. 4, in the electric hedge trimmer 20 of the present embodiment, the first semiconductor switch Q1 and the second semiconductor switch Q2 are connected in series on a current path from a converter 42 as a direct current power source to the motor 25. A control circuit 43 is also provided which turns ON/OFF the respective semiconductor switches Q1, Q2. Both the semiconductor switches Q1, Q2 are MOSFETs as in the first embodiment. The same components as those in the first embodiment, including these semiconductor switches Q1, Q2, are given the same signs.

The present embodiment is the same with the first embodiment in that the two semiconductor switches Q1, Q2 are provided on the current path to the motor 25. The present embodiment is also the same with the first embodiment in that the two contact switches, that is, the grip switch 31 and the trigger switch 32, are provided as the switches operated by the user.

The present embodiment is largely different from the first embodiment mainly in electrical connection states of the two switches 31, 32 operated by the user and how the two semiconductor switches Q1, Q2 are turned ON/OFF depending on operation states of the respective switches 31, 32.

In the electric hedge trimmer 20 of the present embodiment, the grip switch 31 and the trigger switch 32 are connected in series, as shown in FIG. 4. Specifically, one end of the grip switch 31 is connected to the gate of the first semiconductor switch Q1 via the resistor R2 and to a cathode of a diode D1. The other end of the grip switch 31 is connected to one end of the trigger switch 32. The other end of the trigger switch 32 is grounded. An anode of the diode D1 is connected to a CPU 44 and to the control power source Vcc via a resistor R3.

In the electric hedge trimmer 20 of the present embodiment constituted as above, the first semiconductor switch Q1 is not turned ON only by turning ON either of the grip switch 31 and the trigger switch 32. Control of the semiconductor switch Q2 is also not performed by the CPU 44. In the present embodiment, when both the grip switch 31 and the trigger switch 32 are turned ON, the first semiconductor switch Q1 is turned ON so that the connection portion of the first semiconductor switch Q1 is conductive. Control of the semiconductor switch Q2 is also performed by the CPU 44.

Specifically, when both the grip switch 31 and the trigger switch 32 are turned ON, the CPU 44 detects that both of these switches 31, 32 are turned ON. This detection is performed by a circuit constituted from the resistor R3 and the diode D1 provided inside the control circuit 43. In other words, if either one of the switches 31, 32 is OFF, current does not flow into the diode D1. Thus, voltage on the anode side of the diode D1 is equal to the voltage of the control power source Vcc. When both the switches 31, 32 are turned ON, current flows into the diode D1 so that the voltage on the anode side of the diode D1 becomes ON voltage (forward voltage) of the diode D1. The ON voltage is lower than the voltage of the control power source Vcc.

The CPU 44 checks the voltage on the anode side of the diode D1 to detect whether or not both the grip switch 31 and the trigger switch 32 are ON. While either one of the switches 31, 32 is OFF, the control signal to turn OFF the second conductor switch Q2 is outputted to the gate circuit 16 thereby to turn OFF the second semiconductor switch Q2. When both the switches 31, 32 are turned ON, the CPU 44 outputs to the gate circuit 16 the control signal to control the second semiconductor switch Q2 so that a desired current flows to the motor 25. The second semiconductor switch Q2 may be controlled to be normally-ON while current flows to the motor 25. Operation of the second semiconductor switch Q2 may be PWM controlled at a specified duty ratio.

When utilizing the electric hedge trimmer 20 of the present embodiment constituted as such, the user holds the grip portion 28 with one hand (right hand, for example) and the grip 22 with the other hand (left hand, for example), so as to support the whole electric hedge trimmer 20. When the user pushes the switch lever 30 to turn ON the grip switch 31 and pulls the trigger 29 to turn ON the trigger switch 32, the first semiconductor switch Q1 is turned ON and the CPU 44 outputs the control signal to apply a desired current to the motor 25 so as to control the second semiconductor switch Q2. Thereby, the motor 25 is rotated to operate the shear blade 24 so that operations such as trimming and pruning become possible.

If either one of the switches 31, 32 is turned OFF, while the motor 25 is rotated, that is, while both the grip switch 31 and the trigger switch 32 are ON, both the first semiconductor switch Q1 and the second semiconductor switch Q2 are turned OFF. Application of current to the motor 25 is stopped.

In the electric hedge trimmer 20 of the present embodiment as well as in the rechargeable grass mower 1 of the first embodiment, due consideration is given to reliability and safety against short-circuit failure of the semiconductor switches Q1, Q2 by providing the two semiconductor switches Q1, Q2 in series on the current path to the motor 25. In other words, even if short-circuit failure occurs to one of the semiconductor switches Q1, Q2, current does not continue to flow to the motor 18 as long as the other of the semiconductor switches Q1, Q2 operates normally.

According to the electric hedge trimmer 20 of the present embodiment, even if short-circuit failure occurs to either one of the first and the second semiconductor switches Q1, Q2, application of current to the motor 25 can be stopped by turning OFF the other which operates normally. It is possible to inhibit the motor 25 from continuing to operate despite the user's intent. Without providing a contact switch having large contact capacity on the current path, reliability can be improved against failure of the semiconductor switches Q1, Q2 which closes/interrupts the current path.

As long as either of the grip switch 31 and the trigger switch 32 operated by the user is turned OFF, both the two semiconductor switches Q1, Q2 remain OFF. When both the grip switch 31 and the trigger switch 32 are turned ON, the two semiconductor switches Q1, Q2 are conductive so that current flows to the motor 25. The much reliable electric hedge trimmer 20 can be provided.

The electric hedge trimmer 20 of the present embodiment is configured such that the user holds the grip portion 28 and the grip 22 respectively with both the right and left hands. If the user releases either of the hands, rotation of the motor 25 is stopped. In other words, the motor 25 can be rotated when the user has firm grip with both hands. The electric hedge trimmer 20 is configured not to be able to be used with one hand. Accordingly, it is possible to provide the electric hedge trimmer 20 with further improved safety and reliability.

Third Embodiment

Figure 5:
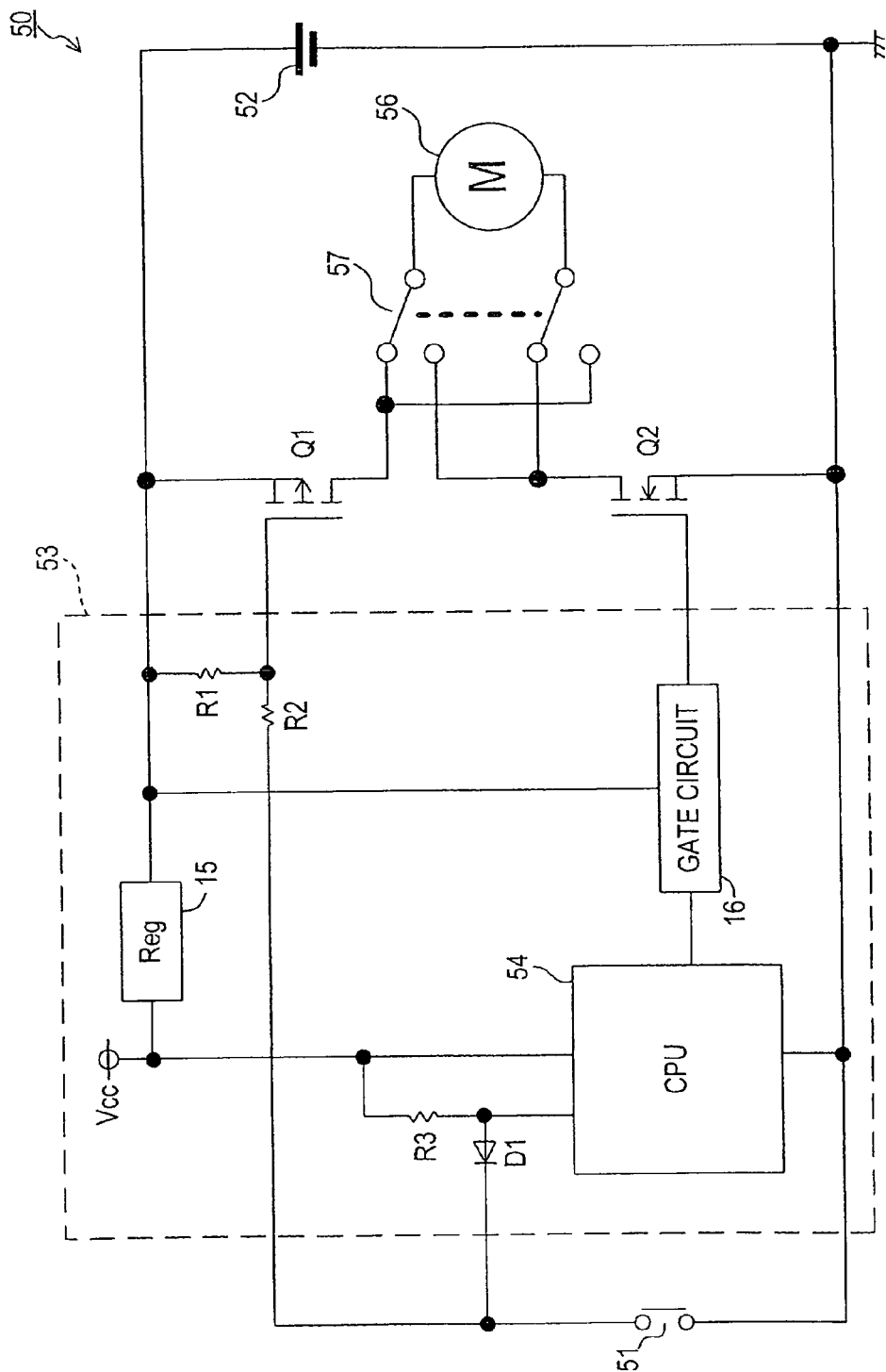
FIG. 5 is an electrical circuit diagram showing a configuration of a rechargeable driver in a third embodiment.

A rechargeable driver 50 of the present embodiment shown in FIG. 5 has an ordinary constitution including a not shown grip that is held with one hand of a user, a not shown housing provided on an upper end side of the grip and houses a motor 56, a gear and others, and a not shown driver bit that is detachably attached to a front end side of the housing. A rotational driving force of the motor 56 is transmitted to the driver bit through the gear and others, thereby to rotate the driver bit.

A contact trigger switch 51 that can be turned ON/OFF while the user holds the grip on one hand is provided on an upper front side of the grip. A battery 52 is detachably provided at a lower end of the grip. A forward reverse changeover switch 57 that is operated by the user for switching a rotation direction of the motor 56 (and a rotation direction of the driver bit) to either a forward direction or a reverse direction is provided on one side of the housing. The motor 56 of the present embodiment is also a brush direct current motor.

The housing that houses the motor 56 and others also accommodates various electronic circuits, devices, wiring lines, etc. such as a control circuit 53 that controls application of current to the motor 56. An operation state (ON/OFF state) of the trigger switch 51 is transmitted to the control circuit 53 through the wiring line. The trigger switch 51 is normally-OFF while the hand of the user is off the trigger switch 51. The trigger switch 51 is turned ON when pulled by the user. The battery 52 includes a rechargeable battery (such as a lithium ion rechargeable battery).

Operation of the rechargeable driver 50 of the present embodiment will now be described in detail referring to FIG. 5. As shown in FIG. 5, in the rechargeable driver 50 of the present embodiment, the first semiconductor switches Q1 and the second semiconductor switch Q2 are connected in series on the current path from the battery 52 to the motor 56. A control circuit 53 is also provided which turns ON/OFF the respective semiconductor switches Q1, Q2. Both the semiconductor switches Q1, Q2 are MOSFETs as in the first embodiment. The same components as those in the first embodiment, including these semiconductor switches Q1, Q2, are given the same signs.

The present embodiment is the same with the first embodiment in that the two semiconductor switches Q1, Q2 are provided on the current path to the motor 56.

The present embodiment is different from the first embodiment mainly in that there is only one switch operated by the user for controlling application of current to the motor 56 and that the forward reverse changeover switch 57 is provided on the current path to the motor 56. In the rechargeable driver 50 of the present embodiment, the contact switch to be operated by the user in order to control application of current to the motor 56 is only the trigger switch 51, as shown in FIG. 5. Specifically, one end of the trigger switch 51 is connected to the gate of the first semiconductor switch Q1 via the resistor R2 and to a cathode of the diode D1. The other end of the trigger switch 51 is grounded. A circuit constituted from the diode D1 and the resistor R3 is the same as that of the second embodiment shown in FIG. 4. From this circuit, an ON/OFF state of the trigger switch 51 is detected by the CPU 54.

In the rechargeable driver 50 of the present embodiment constituted as such, when the user turns on the trigger switch 51, the first semiconductor switch Q1 is turned ON and current flows through the connection portion of the first semiconductor switch Q1. The CPU 54 detects that the trigger switch 51 is turned ON from the circuit constituted from the resistor R3 and the diode D1 provided inside the control circuit 53. As a result, the CPU 54 outputs the control signal to the gate circuit 16 to control the second semiconductor switch Q2 so that a desired current flows to the motor 56. The second semiconductor switch Q2 may be controlled to be normally-ON while current flows to the motor 56. Operation of the second semiconductor switch Q2 may be PWM controlled at a specified duty ratio.

The motor 56 used in the rechargeable driver 50 of the present embodiment is a direct current motor. Since the forward reverse changeover switch 57 is provided, however, the rotation direction of the motor 56 can be changed over.

According to the rechargeable driver 50 of the present embodiment as well as in the first and the second embodiments, due consideration is given to reliability and safety against short-circuit failure of the semiconductor switches Q1, Q2 by providing the two semiconductor switches Q1, Q2 in series on the current path to the motor 56. In other words, even if short-circuit failure occurs to one of the semiconductor switches Q1, Q2, current does not continue to flow to the motor 18 as long as the other of the semiconductor switches Q1, Q2 operates normally.

According to the rechargeable driver 50 of the present embodiment, even if short-circuit failure occurs to either one of the first and the second semiconductor switches Q1, Q2, application of current to the motor 56 can be stopped by turning OFF the other which operates normally. It is possible to inhibit the motor 56 from continuing to operate despite the user's intent. Without providing a contact switch having large contact capacity on the current path, reliability can be improved against failure of the semiconductor switches Q1, Q2 which closes/interrupts the current path.

Moreover, the contact switch operated by the user to control current is only the trigger switch 51. Thus, reliability against short-circuit failure of the semiconductor switches Q1, Q2 can be improved with small number of parts.

The trigger switch 51 is a switch that is frequently turned ON/OFF by the user, while the forward reverse changeover switch 57 is very rarely operated as compared with the trigger switch 51. There is almost no effect on usability by the user if the forward reverse changeover switch 57 is provided in a vicinity of the motor 56 or the respective semiconductor switches Q1, Q2. Accordingly, although it is necessary to use the forward reverse changeover switch 57 having contact capacity that can bear a high current, the forward reverse changeover switch 57 can be provided in a vicinity of the motor 56 or the respective semiconductor switches Q1, Q2 so as not to draw a wiring line through which a high current flows over a long distance.

Fourth Embodiment

Figure 6:
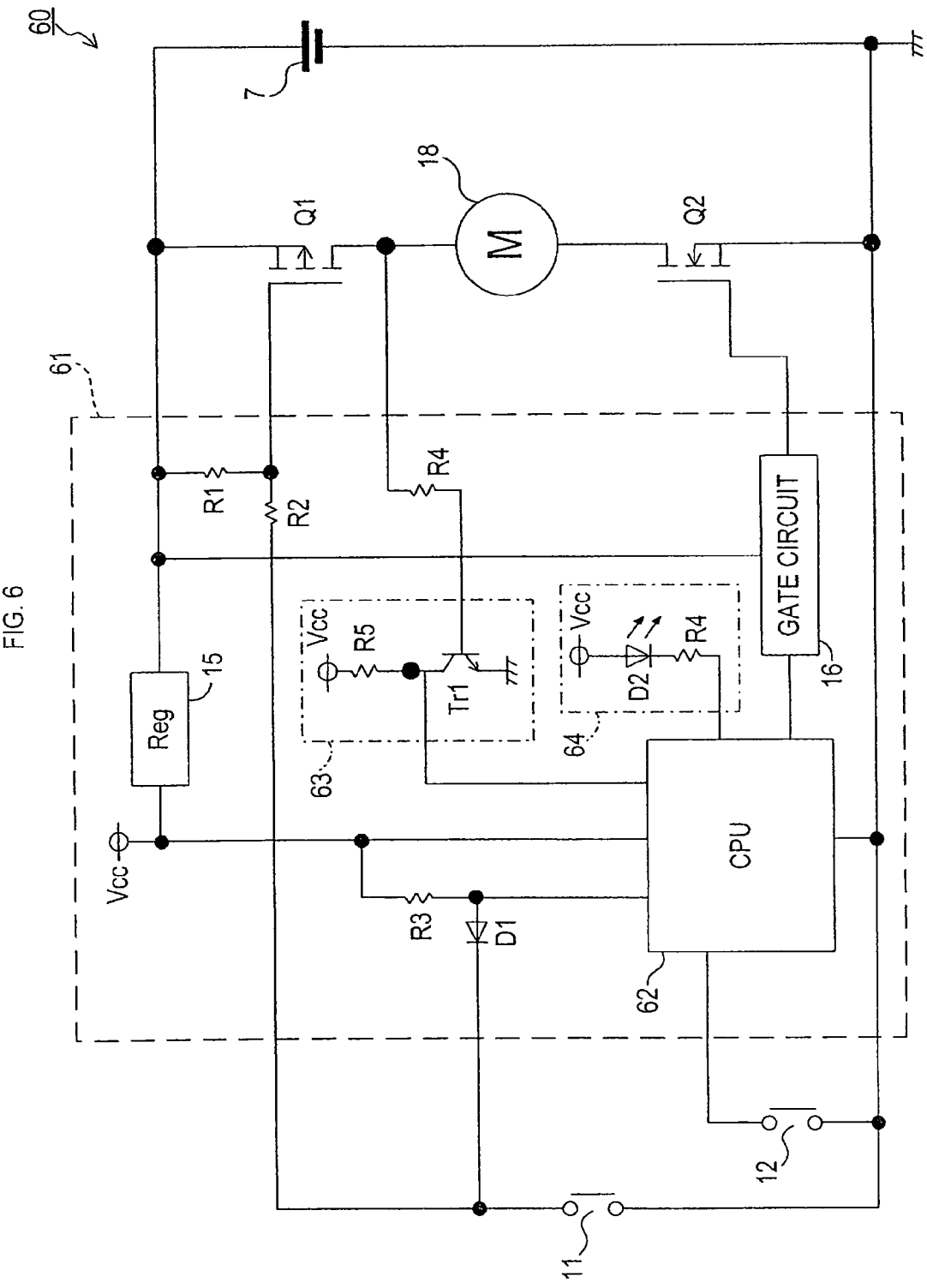
FIG. 6 is an electrical circuit diagram showing a configuration of a rechargeable grass mower in a fourth embodiment.

A rechargeable grass mower 60 of the present embodiment shown in FIG. 6 is principally different from the rechargeable grass mower 1 of the first embodiment (see FIG. 2) in that the rechargeable grass mower 60 includes, in a control circuit 61: a conductive state detection circuit 63 that detects short-circuit failure of the first semiconductor switch Q1; an failure notification circuit 64 that notifies short-circuit failure of the first semiconductor switch Q1 upon detection of the same; and a circuit constituting from the diode D1 and the resistor R3 for a CPU 62 to detect a state of the lock-off switch 11. The other same components as those in the first embodiment are given the same signs, and description thereof will be omitted. The configuration and the operation of the detection circuit constituted from the diode D1 and the resistor R3 are the same as those in the second and the third embodiments.

The conductive state detection circuit 63 provided in the control circuit 61 includes a NPN bipolar transistor Tr1 and a resistor R5. Particularly, an emitter of the transistor Tr1 is grounded, a collector of the transistor Tr1 is connected to the control power source Vcc via the resistor R5 and to the CPU 62. A base of the transistor Tr1 is connected to the drain of the first semiconductor switch Q1.

In the above constitution, if the first semiconductor switch Q1 operates normally, the first semiconductor switch Q1 is turned ON and current flows when the user turns ON the lock-off switch 11. Accordingly, the transistor Tr1 in the conductive state detection circuit 63 is turned ON. A collector potential of the transistor Tr1 is approximately equal to a ground potential. In other words, the signal inputted from the conductive state detection circuit 63 to the CPU 62 becomes low level. On the other hand, when the user turns OFF the lock-off switch 11, the first semiconductor switch Q1 is turned OFF, and the transistor Tr1 is turned OFF. The collector potential of the transistor Tr1 becomes approximately equal to the voltage of the control power source Vcc. In other words, the signal inputted from the conductive state detection circuit 63 to the CPU 62 becomes high level.

When short-circuit failure occurs to the first semiconductor switch Q1, the first semiconductor switch Q1 remains conductive even if the user turns OFF the lock-off switch 11. The signal inputted from the conductive state detection circuit 63 to the CPU 62 remains low level.

The CPU 62 checks the conductive state of the first semiconductor switch Q1 when the lock-off switch 11 is OFF (i.e., when an anode potential of the diode D1 is high level), based on the signal from the conductive state detection circuit 63 and the anode potential of the diode D1. When it is detected that the first semiconductor switch is conductive although the lock-off switch 11 is OFF, the CPU 62 operates the failure notification circuit 64 to notify the user that failure has occurred to the rechargeable grass mower 60.

The failure notification circuit 64 includes a light-emitting diode D2 of which anode is connected to the control power source Vcc and cathode is connected to the CPU 62 via a resistor R4. Upon notification of failure, the CPU 62 adjusts a port connected to the resistor R4 to low level so as to make the light-emitting diode D2 emit light.

According to the rechargeable grass mower 60 of the present embodiment, short-circuit failure of the first semiconductor switch Q1 can be detected and detection of short-circuit failure is notified to the user. Thus, the user can notice that failure has occurred and promptly take appropriate measures against short-circuit failure.

At what timing detected short-circuit failure is notified to the user can be arbitrarily determined. For example, failure may not be notified immediately after the detection but may be notified when the user performs ON-operation of the lock-off switch 11. Or, for example, failure may be notified when a state in which short-circuit failure is detected continues for a specified period (e.g., several seconds to minutes). In this case as well, failure may not be notified immediately after the state in which short-circuit failure is detected continues for the specified period but may be notified when the user performs ON-operation of the lock-off switch 11.

Fifth Embodiment

Figure 7:
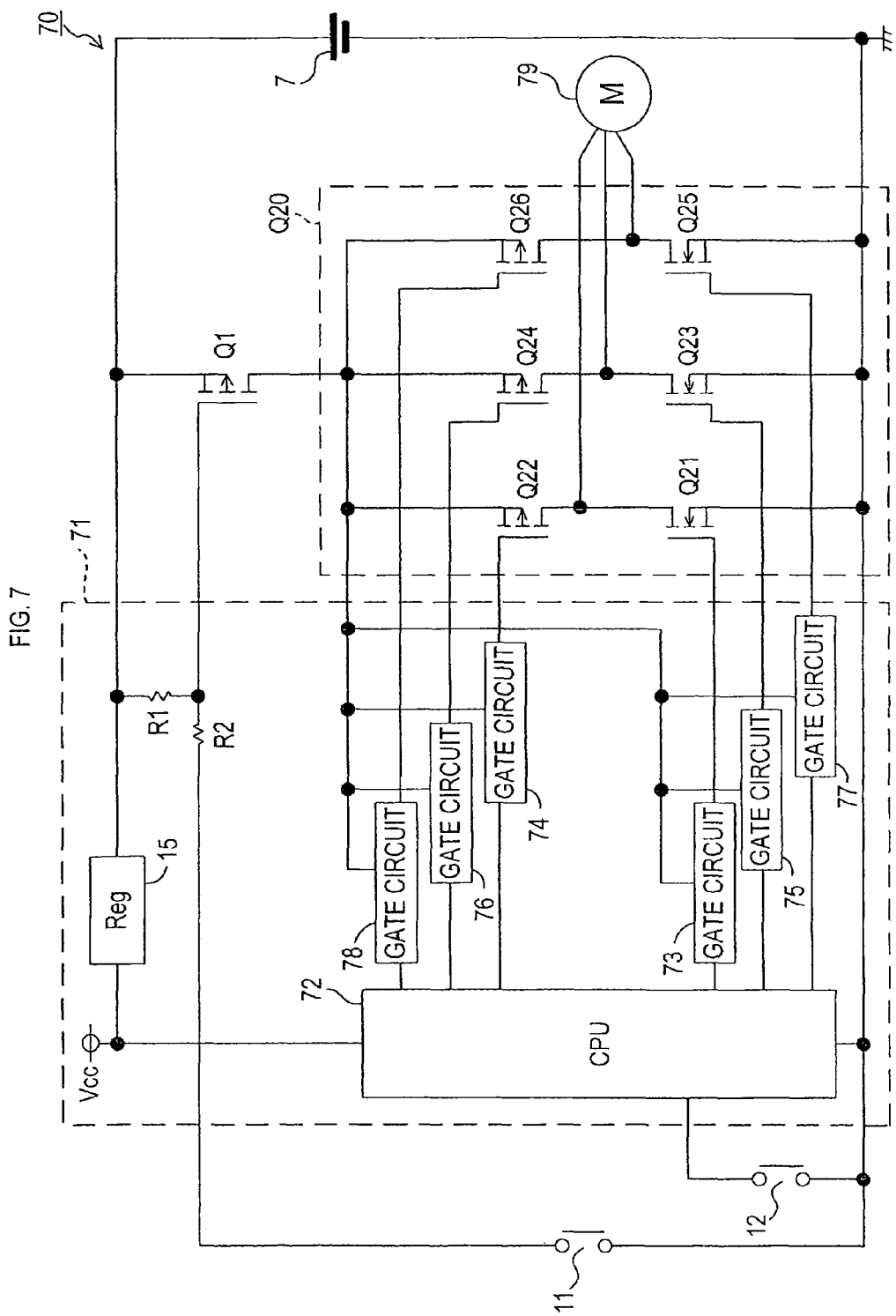
FIG. 7 is an electrical circuit diagram showing a configuration of a rechargeable grass mower in a fifth embodiment.

A rechargeable grass mower 70 of the present embodiment shown in FIG. 7 is different from the rechargeable grass mower 1 of the first embodiment (see FIG. 2) in that a brushless direct current motor is used as a motor 79.

Moreover, while the second semiconductor switch Q2 is constituted from one semiconductor switching device in the first embodiment, a second semiconductor switch Q20 of the present embodiment is configured as a three-phase bridge circuit including six semiconductor switching devices Q21, Q22, Q23, Q24, Q25, Q26 (all are MOSFETs) well known as a driving circuit for driving a brushless direct current motor, as shown in the figure.

In a control circuit 71, six gate circuits 73, 74, 75, 76, 77, 78 are provided for respectively turn ON/OFF the six semiconductor switching devices Q21, Q22, Q23, Q24, Q25, Q26 constituting the second semiconductor switch Q20 as a three-phase bridge circuit.

The CPU 72 outputs control signals for controlling the respective semiconductor switching devices Q21, Q22, Q23, Q24, Q25, Q26 inside the second semiconductor switch Q20 to the gate circuits 73, 74, 75, 76, 77, 78 so that a desired current flows to the motor 79 when the trigger switch 12 is turned ON.

As noted above, in the rechargeable grass mower 70 of the present embodiment in which the second semiconductor switch Q20 is constituted as a known three-phase bridge circuit for driving a brushless direct current motor, application of current to the motor 79 can be stopped by turning OFF the first semiconductor switch Q1 even if short-circuit failure occurs to the semiconductor switching device(s) in the three-phase bridge circuit (the second semiconductor switch Q20). Conversely, as long as the second semiconductor switch Q20 operates normally, application of current to the motor 79 can be stopped by the second semiconductor switch Q20 even if short-circuit failure occurs to the first semiconductor switch Q1. The same effect as in the first embodiment can be achieved.

Sixth Embodiment

Figure 8:
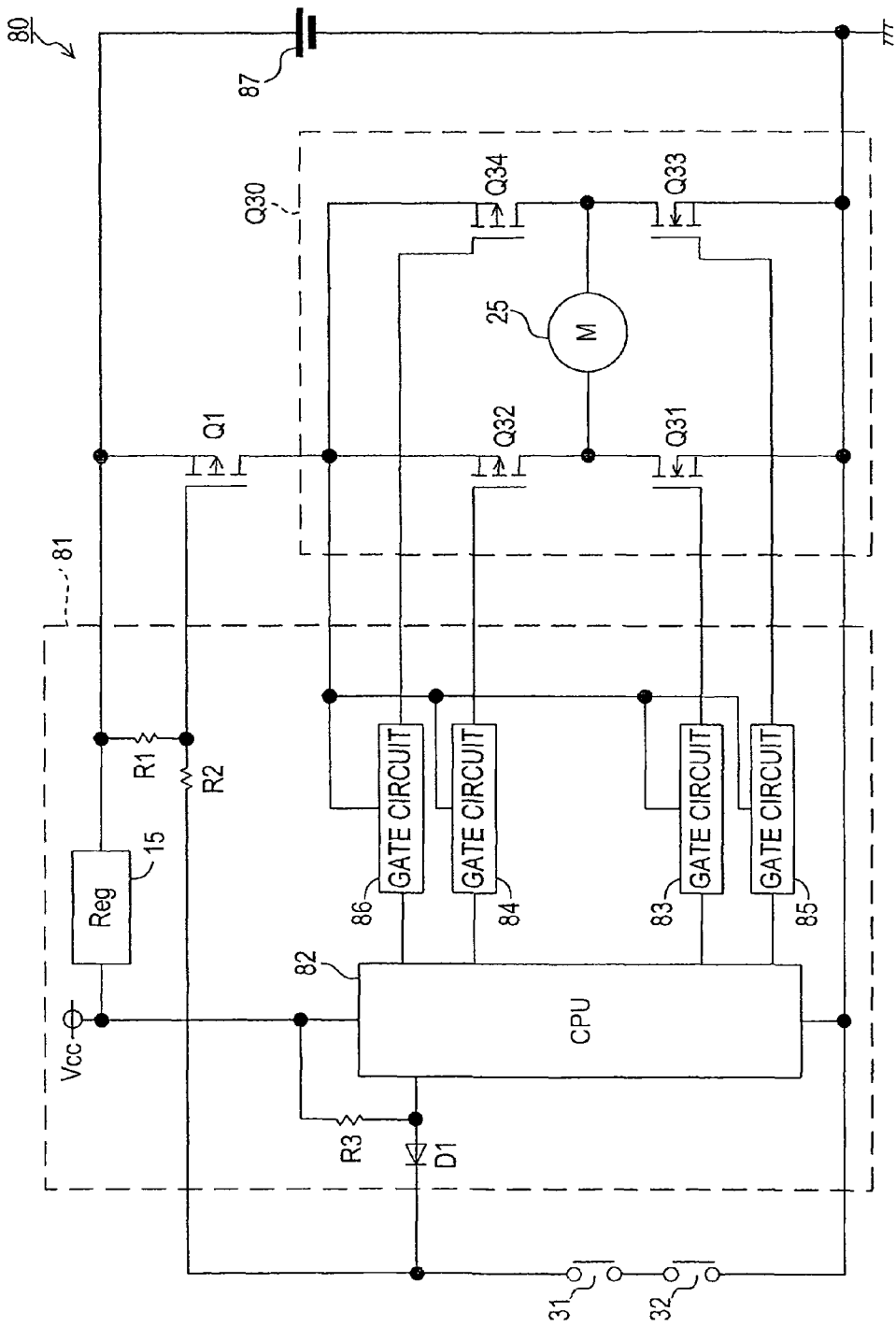
FIG. 8 is an electrical circuit diagram showing a configuration of an electric hedge trimmer in a sixth embodiment.

A rechargeable hedge trimmer 80 of the present embodiment shown in FIG. 8 is different from the rechargeable hedge trimmer 20 of the second embodiment (see FIG. 4) in that a battery 87 is used as a power source. The battery 87 is a rechargeable battery like the battery 7 in the first embodiment.

Moreover, while the second semiconductor switch Q2 is constituted from one semiconductor switching device in the second embodiment, a second semiconductor switch Q30 of the present embodiment is configured as an H-bridge circuit (full bridge circuit) including four semiconductor switching devices Q31, Q32, Q33, Q34 (all are MOSFETs) well known as a driving circuit for allowing a direct current motor rotate in both forward and backward directions, as shown in the figure.

In a control circuit 81, four gate circuits 83, 84, 85, 86 are provided for respectively turn ON/OFF the four semiconductor switching devices Q31, Q32, Q33, Q34 constituting the second semiconductor switch Q30 as an H-bridge circuit.

The CPU 82 outputs control signals to the gate circuits 83, 84, 85, 86 for controlling the respective semiconductor switching devices Q31, Q32, Q33, Q34 inside the second semiconductor switch Q30 so that a desired current flows to the motor 25 when both the grip switch 31 and the trigger switch 32 are turned ON.

In the rechargeable hedge trimmer 80 of the present embodiment in which the second semiconductor switch Q30 is constituted as a known H-bridge circuit, application of current to the motor 25 can be stopped by turning OFF the first semiconductor switch Q1 even if short-circuit failure occurs to the semiconductor switching device(s) in the H-bridge circuit (the second semiconductor switch Q30). Conversely, as long as the second semiconductor switch Q30 operates normally, application of current to the motor 25 can be stopped by the second semiconductor switch Q30 even if short-circuit failure occurs to the first semiconductor switch Q1. The same effect as in the second embodiment can be achieved.

Seventh Embodiment

Figure 9:
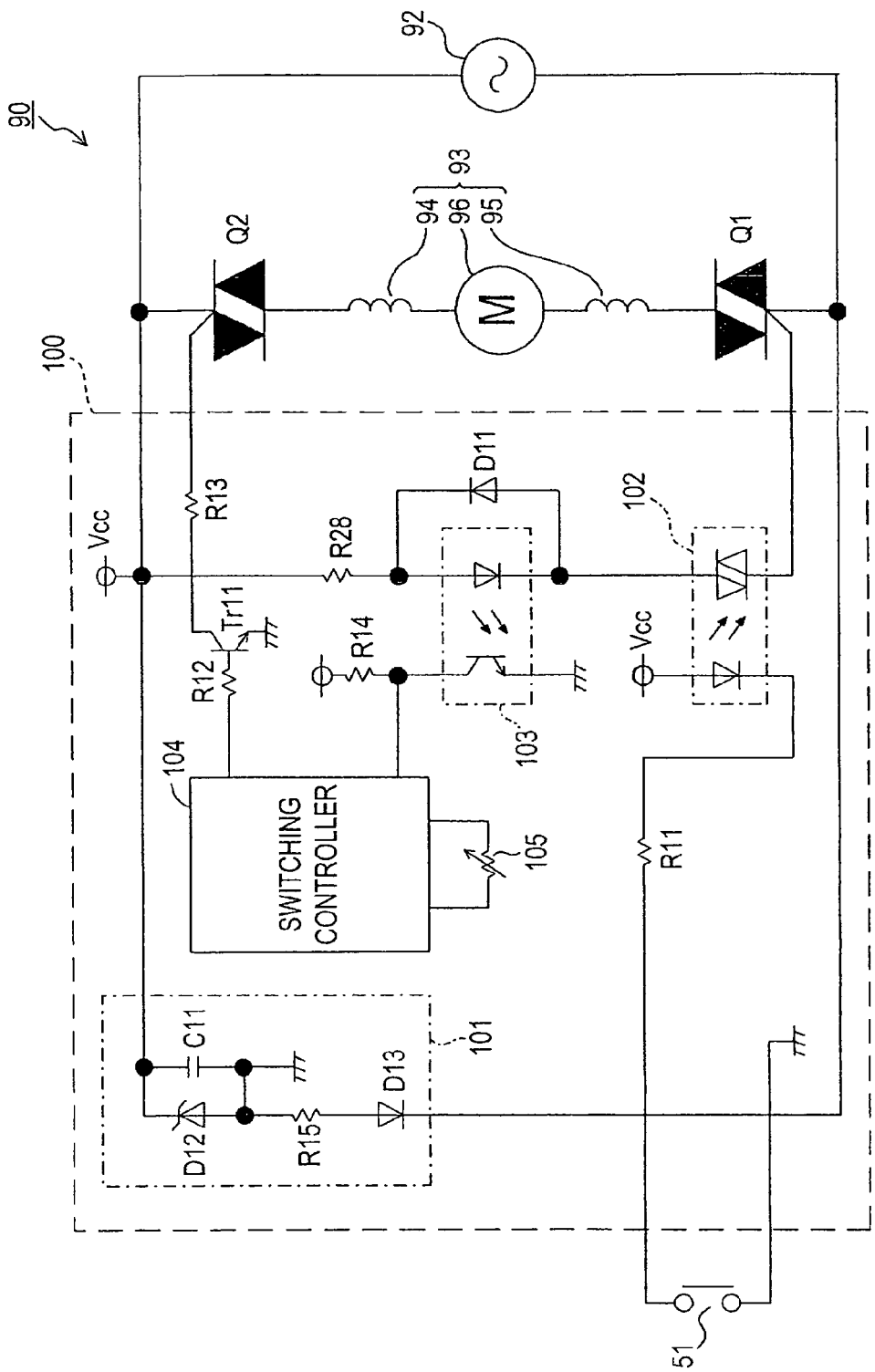
FIG. 9 is an electrical circuit diagram showing a configuration of an electric driver in a seventh embodiment.

While the rechargeable driver 50 of the third embodiment (see FIG. 5) includes a direct current motor driven by the battery 52 as a power source, a motor 93 of an electric driver 90 of the present embodiment shown in FIG. 9 is rotated by an alternate current power source 92 of single-phase 100 V.

The motor 93 is a series-wound motor (universal motor) in which field windings 94, 95 and an armature winding 96 are connected in series. On the current path from the alternate current power source 92 to the motor 93, the first semiconductor switch Q1 and the second semiconductor switch Q2 are provided in series. Both the semiconductor switches Q1, Q2 are triacs. The present embodiment is the same as the third embodiment in that the trigger switch 51 is provided as a contact switch operated by the user.

The electric driver 90 includes a control circuit 100 for turning ON/OFF the two semiconductor switches Q1, Q2 in accordance with the state of the trigger switch 51 operated by the user.

The control circuit 100 includes: a constant voltage power source circuit 101 that steps down/rectifies a voltage of the alternate current power source 92 to the predetermined voltage of the control power source Vcc; a triac output photocoupler (hereinafter, referred to as a "phototriac") 102 that turns ON/OFF the first semiconductor switch Q1 and a transistor output photocoupler 103 in accordance with the operation state of the trigger switch 51; the transistor output photocoupler (hereinafter, referred to as a "phototransistor") 103 that outputs a signal in accordance with a state of the phototriac 102 (i.e., in accordance with the operation state of the trigger switch 51); and a switching controller 104 that generates/outputs a control signal for controlling the second semiconductor switch Q2 in accordance with the signal from the phototransistor 103.

The constant voltage power source circuit 101 includes: a zener diode D12 of which cathode is connected to the alternate current power source 92 and anode is connected to one end of a resistor R15 and grounded; and a condenser C11 connected in parallel between the anode and cathode of the zener diode D12. The constant voltage power source circuit 101 generates the voltage of the control power source Vcc for driving respective portions in the control circuit 100. The other end of the resistor R15 is connected to an anode of a diode D13. A cathode of the diode D13 is connected to the alternate current power source 92.

The phototriac 102 is a known device including a light-emitting diode and a triac that is turned ON/OFF in accordance with a state of the light-emitting diode. A cathode of the light-emitting diode is connected to one end of the trigger switch 51 via a resistor R11. Accordingly, while the trigger switch 51 is OFF, the phototriac remains OFF. When the trigger switch 51 is turned ON, the phototriac 102 is turned ON, thereby causing the first semiconductor switch Q1 to be turned ON (conductive).

When the phototriac 102 is turned ON, the phototransistor 103 is also turned ON. A collector of the transistor constituting the phototransistor 103 is connected to the control power source Vcc via a resistor R14 and to the switching controller 104. When the phototransistor 103 is turned ON, a low level signal is inputted from the phototransistor 103 to the switching controller 104. When the phototransistor 103 is turned OFF, a high level signal is inputted from the phototransistor 103 to the switching controller 104.

In other words, not only the first semiconductor switch Q1 is turned ON/OFF in accordance with the operation state of the trigger switch 51, but also the operation state of the trigger switch 51 is transmitted to the switching controller 104 through the phototriac 102 and the phototransistor 103.

The switching controller 104 is a general circuit for phase controlling the triac, constituted from a plurality of cascade-connected Exclusive-OR circuits, delay circuits provided between the respective Exclusive-OR circuits, and others. Each time when the voltage of the alternate current power source 92 passes a zero cross point, the switching controller 104 outputs a high level signal at timings delayed by a predetermined time from timings of passing the zero cross point, to a transistor Tr11 via a resistor R12 to turn ON the transistor Tr11. A collector of the transistor Tr11 is connected to the gate of the second semiconductor switch Q2 via a resistor R13. Thus, when the transistor Tr11 is turned ON, the second semiconductor switch Q2 is turned ON to apply current to the motor 93.

Time from the timings of passing the zero cross point until when the transistor Tr11 is turned ON can be adjusted by an adjustment volume 105 constituted from a variable resistor. The adjustment volume 105 constitutes a delay circuit together with a condenser inside the switching controller 104. A time constant of the delay circuit is changed by the adjustment volume 105, so that a timing to turn ON the transistor Tr11, and further a number of rotation of the motor 93, can be changed.

In the above constituted electric driver 90 of the present embodiment as well, since the two semiconductor switches Q1, Q2 are provided in series on the current path to the motor 93, due consideration is given to reliability and safety against short-circuit failure of the semiconductor switches Q1, Q2. Specifically, even if short-circuit failure occurs to one of the semiconductor switches Q1, Q2, current does not continue to flow to the motor 18 as long as the other of the semiconductor switches Q1, Q2 operates normally.

According to the electric driver 90 of the present embodiment as well as in the other embodiments, even if short-circuit failure occurs to either one of the first and the second semiconductor switches Q1, Q2, application of current to the motor 93 can be stopped by turning OFF the other which operates normally. It is possible to inhibit the motor 18 from continuing to operate despite the user's intent.

[Variations]

Although embodiments of the present invention have been described above, it is to be understood that the present invention should not be limited to the above embodiments, but may be embodied in various forms within the technical scope of the invention.

For instance, while the first semiconductor switch Q1 is provided on the upstream side of the second semiconductor switch Q2 on the current path in the above first to sixth embodiments, the first semiconductor switch Q1 may be provided on the downstream side of the second semiconductor switch Q2. In the first to fourth embodiments, both the semiconductor switches Q1, Q2 may be provided on the upstream side or on the downstream side of the motor. The same applies to the seventh embodiment. How to connect the motor 93 and the two semiconductor switches Q1, Q2 on the current path can be arbitrarily determined as long as the motor 93 and the two semiconductor switches Q1, Q2 are connected in series.

While the first semiconductor switch Q1 includes one semiconductor switching device in the above embodiments, the first semiconductor switch Q1 may include a plurality of semiconductor switching devices. The second semiconductor switch Q2 of the first to the third and the seventh embodiments may also include a plurality of semiconductor switching devices.

In the electric hedge trimmer 20 of the second embodiment, neither of the semiconductor switches Q1, Q2 is turned ON as long as both the two operation switches (the grip switch 31 and the trigger switch 32) operated by the user are not turned ON. Such constitution can be applied to the rechargeable grass mower of the first, the fourth and the fifth embodiments, the rechargeable driver of the third embodiment, and the electric power driver of the seventh embodiment.

On the contrary, the constitution, as in the rechargeable grass mower 1 of the first embodiment, such that the first semiconductor switch Q1 is turned ON when one of the operation switches (the lock-off switch 11) is turned ON, and the second semiconductor switch Q2 is turned ON when the other of the operation switches (the trigger switch 12) is turned ON, may be applied to the second, the third, the sixth and the seventh embodiments.

In the fourth embodiment, the conductive state detection circuit 63 and the failure notification circuit 64 are provided. If the first semiconductor switch Q1 is conductive when the lock-off switch 11 is OFF (i.e., short-circuit failure has occurred), the failure is notified to the user. Such detection and notification function of short-circuit failure of the first semiconductor switch Q1 can be applied to the other embodiments in the same manner.

When short-circuit failure is detected, the failure is visually notified to the user by lightening the light-emitting diode D2 in the fourth embodiment. This is only an example, and the failure may be notified, for example, aurally by voice and the like. Also, for example, when it is detected by the conductive state detection circuit 63 that the first semiconductor switch Q1 is ON (conductive) although the lock-off switch 11 is OFF (in other words, when a short-circuit failure is detected by the conductive state detection circuit 63□, the second semiconductor switch Q2 may be forcibly turned OFF by the CPU 62 regardless of operation by the user from then on so that the motor is not activated.

A MOSFET is used as an example of the semiconductor switching device constituting the semiconductor switch in the first to sixth embodiments. A triac is used as the example in the seventh embodiment. Any kinds such as, for example, a bipolar transistor, a thyristor, an IGBT (insulated gate bipolar transistor), a GTO (gate turnoff thyristor) and others can be adopted as the semiconductor switching device constituting the semiconductor switch that applies/interrupts current to the motor.

In the rechargeable grass mower 1 of the first embodiment, the trigger switch 12 cannot be drawn while the lock-off switch 11 is not depressed. Also, when only the lock-off switch 11 is released while both the switches 11, 12 are ON, the lock-off switch 11 does not return to its original position unless the trigger switch 12 is returned as well. Such constitution of the switches 11, 12 is only an example. Each of the lock-off switch 11 and the trigger switch 12 may be configured to be turned ON/OFF individually.

The above embodiments provide examples in which the present invention is applied to a grass mower, a hedge trimmer, and a driver. These are only examples and the present invention can be applied to any electric power tool activated by a motor as a driving source.

What is claimed is:

1. An electric power tool, comprising:
a motor as a driving source;
a first operation switch that is operated by a user to be turned ON/OFF;
a first semiconductor switch that is provided on a current path from a power source to the motor and includes at least one semiconductor switching device, the first semiconductor switch being turned OFF to interrupt the current path when the first operation switch is OFF, and the first semiconductor switch being turned ON to close the current path when the first operation switch is ON; and
a second semiconductor switch that is provided, separately from the first semiconductor switch on the current path, in series with the first semiconductor switch and includes at least one semiconductor switching device, the second semiconductor switch closing/interrupting the current path by being turned ON/OFF in accordance with an input control signal.

2. The electric power tool according to claim 1 further comprising:
a control unit that outputs the control signal for controlling the second semiconductor switch to the second semiconductor switch.

3. The electric power tool according to claim 2 further comprising:
a conductive state detection unit that detects a conductive state of the first semiconductor switch when the first operation switch is OFF.

4. The electric power tool according to claim 3 further comprising:
a notification unit that notifies the user that the first semiconductor switch is failed, if it is detected by the conductive state detection unit that the first semiconductor switch is conductive when the first operation switch is OFF.

5. The electric power tool according to claim 3 further comprising:
a compulsory off unit that forcibly turns OFF the second semiconductor switch if it is detected by the conductive state detection unit that the first semiconductor switch is conductive when the first operation switch is OFF.

6. The electric power tool according to claim 2, wherein the control unit operates in accordance with the state of the first operation switch, the control unit interrupting the current path by outputting the control signal to turn OFF the second semiconductor switch when the first operation switch is OFF, while outputting the control signal to apply current to the motor when the first operation switch is ON.

7. The electric power tool according to claim 2 further including
a second operation switch that is operated by the user to be turned ON/OFF separately from the first operation switch, wherein
the control unit operates in accordance with the state of the second operation switch, the control unit interrupting the current path by outputting the control signal to turn OFF the second semiconductor switch when the second operation switch is OFF, while outputting the control signal to apply current to the motor when the second operation switch is ON.

8. The electric power tool according to claim 7 further including:
a first grip member to be held with one hand of the user when the user uses the electric power tool; and
a second grip member to be held with the other hand of the user when the user uses the electric power tool, wherein
each of the first operation switch and the second operation switch is provided on either of the first gripping member or on the second gripping member.

9. The electric power tool according to claim 8, wherein the electric power tool is a grass mower including:
a motor housing that houses a motor;
a power supplier that supplies power to the motor;
a mowing blade for mowing grass that is rotated by a driving force of the motor; and
a bar-like main support member having a specified length, the motor housing and the power supplier being provided on one end side of the main support member, and the mowing blade being rotatably provided on the other end side of the main support member, wherein
both the first gripping member and the second gripping member are provided on the main support member, each of the first operation switch and the second operation switch is provided on either of the first gripping member or the second gripping member so as to be operable by the user holding the gripping member.

10. The electric power tool according to claim 8, wherein the first operation switch is provided on one of the first gripping member and the second gripping member in such a manner as to be operated by the user holding the gripping member and turned OFF when the first operation switch is off the hand of the user, and the second operation switch is provided on the other of the first gripping member and the second gripping member where the first operation switch is not provided in such a manner as to be operated by the user holding the gripping member and turned OFF when the second operation switch is off the hand of the user.

11. The electric power tool according to claim 2 further including a second operation switch that is operated by the user to be turned ON/OFF separately from the first operation switch, wherein the first semiconductor switch is turned OFF when either one of the first operation switch and the second operation switch is OFF, and turned ON when both the operation switches are ON, and the control unit outputs the control signal for turning OFF the second semiconductor switch to interrupt the current path when either one of the first operation switch and the second operation switch is OFF, and outputs the control signal to apply current to the motor when both the operation switches are ON.

12. The electric power tool according to claim 1, wherein the motor is a brush direct current motor activated by direct current, and the second semiconductor switch is configured as an H-bridge circuit including a plurality of semiconductor switching devices.

13. The electric power tool according to claim 1, wherein the motor is a brush direct current motor activated by direct current, and the second semiconductor switch is configured as a three-phase bridge circuit including a plurality of semiconductor switching devices.

* * * * *